United States Patent
Shrivastava

(10) Patent No.: US 10,873,553 B2
(45) Date of Patent: *Dec. 22, 2020

(54) SYSTEM AND METHOD FOR TRIAGING IN A MESSAGE SYSTEM ON SEND FLOW

(71) Applicant: VERIZON MEDIA INC., New York, NY (US)

(72) Inventor: Utkarsh Shrivastava, San Jose, CA (US)

(73) Assignee: VERIZON MEDIA INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/147,655

(22) Filed: Sep. 29, 2018

(65) Prior Publication Data

US 2019/0036862 A1 Jan. 31, 2019

Related U.S. Application Data

(63) Continuation of application No. 14/563,121, filed on Dec. 8, 2014, now Pat. No. 10,097,498.

(51) Int. Cl.
*G06F 15/16* (2006.01)
*H04L 12/58* (2006.01)
*H04L 29/06* (2006.01)
*G06F 21/62* (2013.01)

(52) U.S. Cl.
CPC .............. *H04L 51/24* (2013.01); *G06F 21/62* (2013.01); *H04L 51/12* (2013.01); *H04L 51/22* (2013.01); *H04L 63/10* (2013.01)

(58) Field of Classification Search
None
See application file for complete search history.

(56) References Cited

U.S. PATENT DOCUMENTS

| 7,941,492 | B2 | 5/2011 | Pearson et al. | |
|---|---|---|---|---|
| 8,655,731 | B2 | 2/2014 | Bosarge et al. | |
| 8,843,567 | B2 * | 9/2014 | Karnik | H04L 51/32 709/206 |
| 2002/0087649 | A1 | 7/2002 | Horvitz | |
| 2003/0046421 | A1 | 3/2003 | Horvitz et al. | |
| 2004/0117451 | A1 * | 6/2004 | Chung | H04L 29/06 709/207 |

(Continued)

*Primary Examiner* — Phuoc H Nguyen
(74) *Attorney, Agent, or Firm* — James J. DeCarlo; Greenberg Traurig, LLP

(57) ABSTRACT

The present disclosure relates to improving the performance of computer systems and/or platforms programmed to work in concert with messaging systems for mail triaging. Disclosed are computer systems and methods for enabling a sender of a message to classify a message addressed to the recipient's inbox prior to sending the message based on triaging settings set by the recipient. Message triaging can include applying a recipient created flag to the message, categorizing the message according to a category preset by the recipient and/or instructing the message to be delivered to a specific folder(s) in the recipient's inbox based on folder instructions set by the recipient. The message sender is capable of classifying the message according to classifications the recipient has designated, whereby upon delivery of the message, the message is delivered and displayed in the recipient's inbox according to the recipient's settings that were selected by the sender.

20 Claims, 9 Drawing Sheets

(56) References Cited

U.S. PATENT DOCUMENTS

| | | | |
|---|---|---|---|
| 2006/0072723 A1* | 4/2006 | Chung | H04L 51/14 |
| | | | 379/93.24 |
| 2006/0085504 A1 | 4/2006 | Yang et al. | |
| 2006/0200523 A1* | 9/2006 | Tokuda | G06Q 10/107 |
| | | | 709/206 |
| 2006/0200530 A1* | 9/2006 | Tokuda | H04L 51/14 |
| | | | 709/206 |
| 2008/0147818 A1* | 6/2008 | Sabo | G06Q 10/00 |
| | | | 709/206 |
| 2008/0172468 A1* | 7/2008 | Almeida | G06Q 10/107 |
| | | | 709/206 |
| 2010/0179961 A1 | 7/2010 | Berry et al. | |
| 2010/0312621 A1* | 12/2010 | Abdulhayoglu | G06Q 30/0241 |
| | | | 705/14.4 |
| 2011/0154474 A1* | 6/2011 | Siegel | G06Q 10/107 |
| | | | 726/12 |
| 2012/0204032 A1 | 8/2012 | Wilkins et al. | |

* cited by examiner

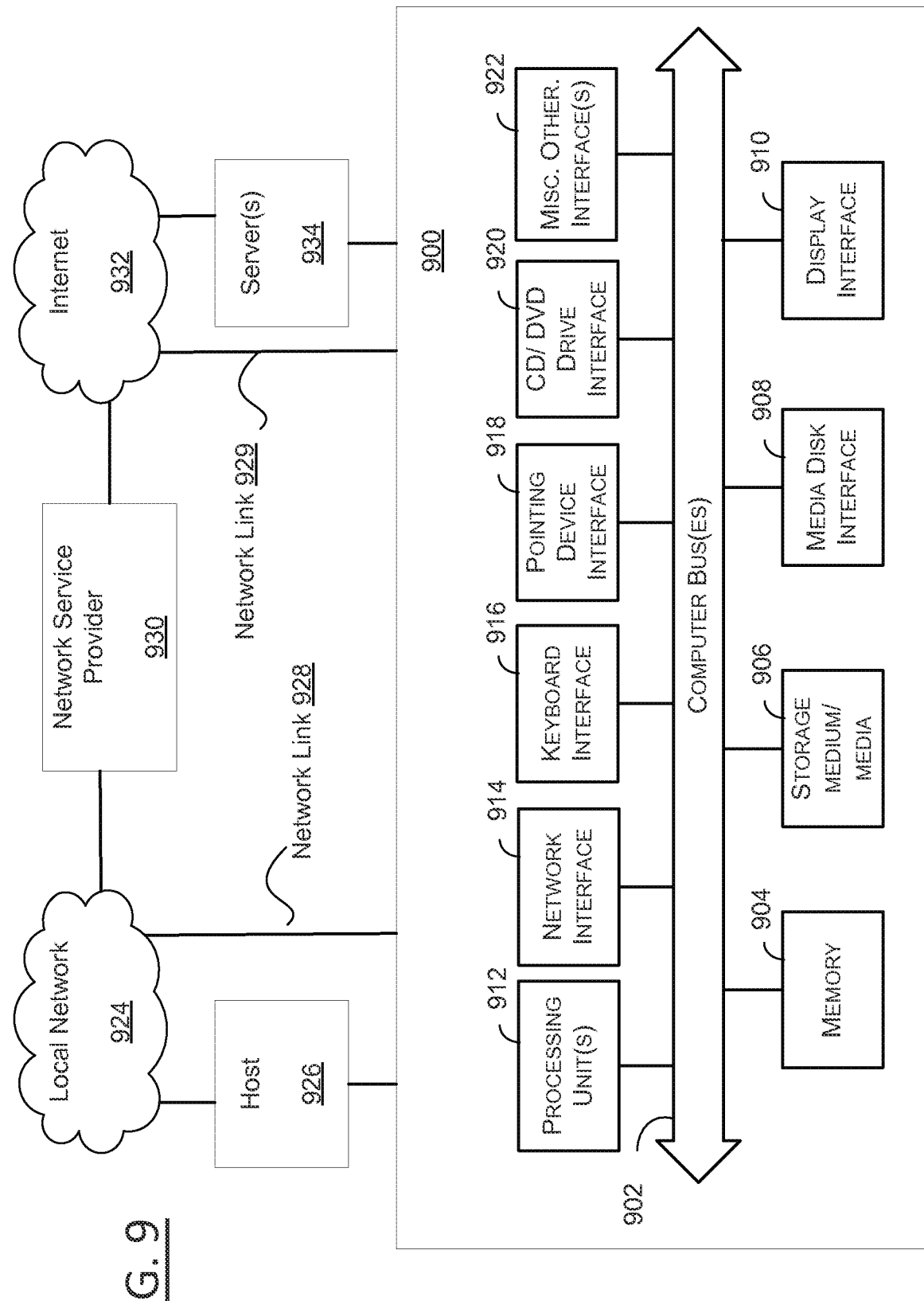

SYSTEM AND METHOD FOR TRIAGING IN A MESSAGE SYSTEM ON SEND FLOW

This patent application claims the benefit of and is a continuation of U.S. patent application Ser. No. 14/563,121, filed on Dec. 8, 2014, titled "System and Method for Triaging in a Message System on Send Flow", which is incorporated by reference herein in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to systems and methods for improving the performance of computer systems and/or platforms programmed to work in concert with messaging systems thereby enabling mail triaging in advance of messages being sent.

BACKGROUND

Electronic mail ("email") usage has become ubiquitous for online users as larger numbers of people are able to access the Internet from an array of devices. In addition to providing a way for individuals to communicate more efficiently with each other, electronic mail also provides an effective form of communication for individuals, businesses, organizations, and other entities interested in communicating with large groups of people, such as friends, family, co-workers, customers, and the like. Thus, electronic communications, such as electronic mail, provide a powerful means of communicating content to a targeted audience.

SUMMARY

The present disclosure describes computer systems and methods for triaging messages prior to delivery to the recipient. That is, according to embodiments of the present disclosure, the disclosed systems and methods enable a sender of a message to classify a message prior to sending the message to a recipient based on triaging settings set by the recipient. In accordance with embodiments of the present disclosure, message triaging, or message classifying, can include applying a label, flag, tag or other alert created and/or preset by the recipient in advance of sending the message. Triaging can also include categorizing the message according to a category preset by the recipient. Triaging can also include filtering the message to be delivered to a specific folder(s) in the recipient's inbox based on folder instructions set by the recipient.

Thus, according to embodiments of the present disclosure, the disclosed systems and methods enable a sending user to triage a message prior to sending the message to the intended recipient. The sender is capable of classifying the message according to classifications the recipient has designated, whereby upon delivery, the message is delivered and displayed in the recipient's inbox according to the recipient's settings that were selected by the sender without any input by the recipient.

In accordance with the disclosed systems and methods, the present disclosure enables a sender to pre-triage messages in a recipient's inbox in accordance with the recipient's classification settings. Thus, the disclosed systems and methods enable message triaging at the sender level which eases and organizes the inflow of messages a recipient receives thereby enabling the recipient to focus on messages that the recipient deems important. This can effectuate increased user engagement in received messages which can lead to increased monetization opportunities through higher click-through-rates (CTRs) and increased return-on-investment (ROI), revenues, salience and relevance of served advertisements.

In accordance with one or more embodiments, a method is disclosed which includes receiving, at a computing device over a network from a first user, a message addressed to an inbox associated with a second user, the message comprising classification information applied by the first user prior to sending the message, the classification information comprising instructions designated by the second user for triaging messages in the second user inbox; parsing, via the computing device, the message to identify the classification information; and communicating, via the computing device over the network, the message to the second user, the communication comprising facilitating automatically triaging the message in the second user inbox based on the classification information.

According to some embodiments, the method further includes receiving, at the computing device over the network from the first user, a request for the first user to be granted permission to pre-classify messages for the second user according to the classification information; and in response to the request, transmitting, over the network, a trust key from the second user to the first user, the trust key enabling the first user access to the classification information.

In accordance with one or more embodiments, a method is disclosed which includes transmitting, by the computing device over a network from a first user, a request for permission to pre-classify messages to a second user according to a classification defined by the second user and associated with an inbox of the second user, the classification comprising instructions designated by the second user for triaging messages in the second user inbox; and in response to the request, receiving, over the network at the computing device, a trust key from the second user, the trust key enabling the first user to classify messages addressed to the second user in accordance with the classification prior to the first user sending the message; receiving, at the computing device, input corresponding to drafting a message addressed to the second user; displaying, via the computing device, the classification to the first user, the display enabling the first user to classify the message prior to sending the message to the second user; applying, via the computing device, the classification to the message based on a selection by the first user; and transmitting, via the computing device over the network, the classified message to the second user, the transmitting facilitating the classified message to be delivered to the second user inbox in accordance with classification.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for mail triaging in advance of sending messages.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 9 is a block diagram illustrating architecture of a hardware device in accordance with one or more embodiments of the present disclosure.

DESCRIPTION OF EMBODIMENTS

Figure 1:
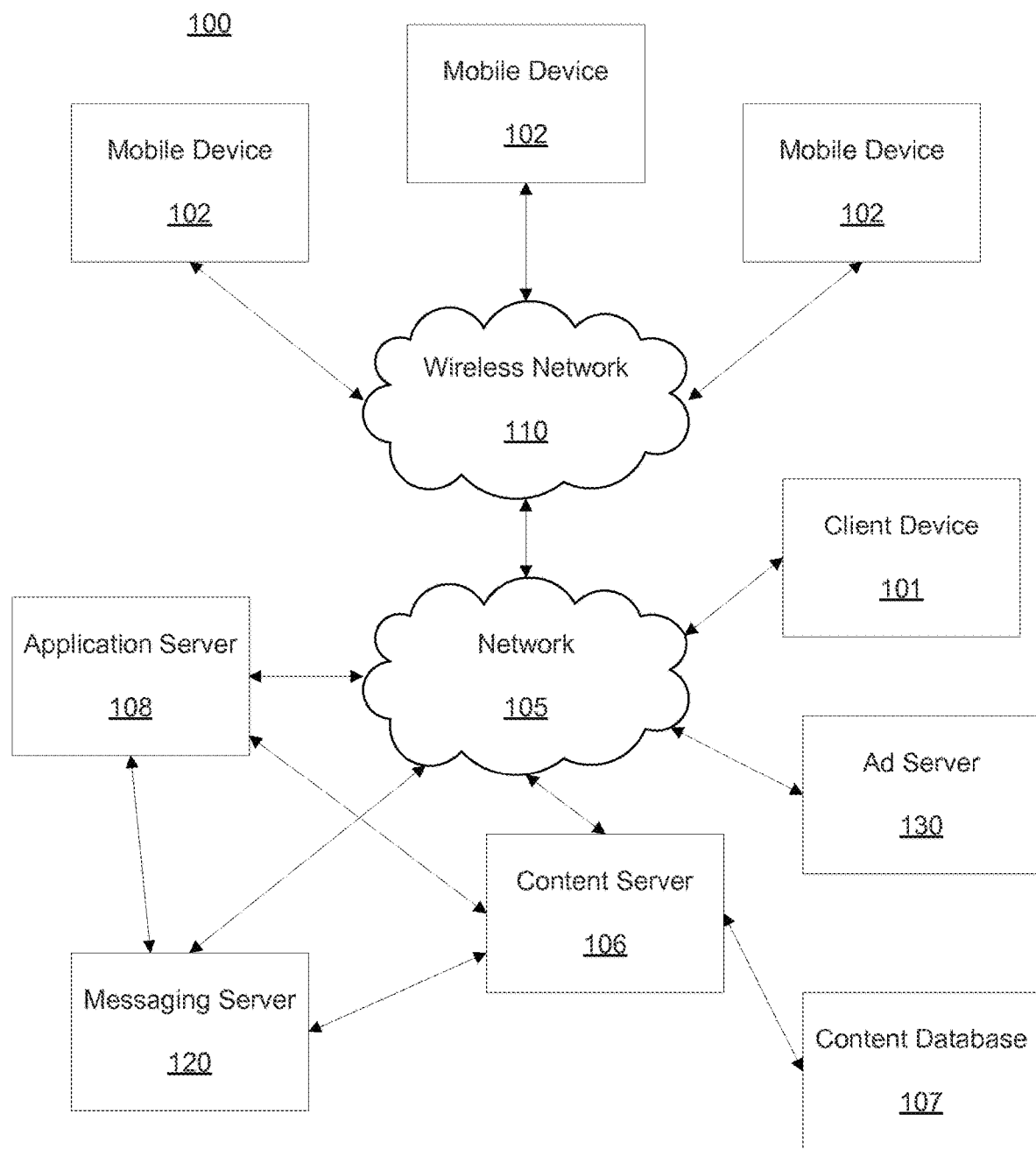
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, phablets, intelligent clothing, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. Traditional messaging systems enable message triaging only by the recipient, and only after receipt of delivered messages. That is, within conventional systems, a message can only be classified after the message is received, and only by the receiving user of such message (referred to as the recipient). As understood by those of skill in the art, the recipient, upon receipt of a message, can apply a label (flag or tag) to a message denoting a predefined or created category. The recipient can also categorize or further classify the message based on recipient defined categories. In traditional messaging systems, such classification can only occur after the message has been received, and can only be effectuated by the receiving user. As understood by those of skill in the art, the recipient can set predefined rules to classify messages in order to automatically apply the recipient defined triage rules to received messages, yet such triaging can only occur upon delivery of messages at the recipient side of the message communication and only based on instructions received from the recipient.

In some conventional systems, a sender may designate a message classification, but such categorization is only applied when the receiving user's messaging system also has such capabilities. For example, if a sender sets a message as "Important," this classification can only be applied to the delivered message when the recipient's messaging system also supports an "Important" categorization. Indeed, such categorizations (or classifications) are not based on triage settings defined by the recipient or sender. Conventional triaging of the sort between a sender and recipient can only occur when both users are using the same mail platform, and the mail platform is pre-configured to support such classification. That is, the classifications are based on the capabilities and definitions set by the messaging systems, not the sender or recipient.

The disclosed computer systems and methods provide functionality to messaging applications, programs, platforms and services, whether executed by a client device, server device or combination thereof, that enables a message to be triaged by a sender of a message prior to the message being sent. The disclosed systems and methods enable a sender of a message to classify, categorize or otherwise triage a message according to recipient specific triaging settings before actually sending the message. As discussed in more detail below, a sender of a message can be authenticated by a recipient thereby allowing the sender to pre-classify an intended message for the recipient in accordance with the recipient defined classifications. Such recipient defined classifications can include, but are not limited to, labeling (or flagging or tagging) messages, categorizing messages and/or filtering messages based on the sender's identity, subject of the message, content of the message, date of the message, or any other type of message content or metadata associated with a message. Therefore, when the sender is drafting a message or upon completion of drafting the message but prior to sending the message, the sender can preset the classification of the message based on the recipient's classifications. Thus, when the message is sent to the recipient, the message is automatically triaged upon delivery and display of the message in accordance with the instructions/definitions associated with such classifications defined by the recipient yet set by the sender.

The disclosed systems and methods enable triaging of messages in a recipient's inbox without any input required by the recipient. Such sender-side triaging enables the classification of messages according to the recipient's classifications prior to the message's transmittal, whereupon delivery of the message results in the automatic display of the message in the recipient's inbox according to such classification as defined by the sender.

By way of a non-limiting example, user Bob is drafting a message to user Jim. Jim's message account has classification (or triaging) settings, set by Jim, to triage incoming messages according to the following categories: "meetings," "restaurants," "work," and "personal." Bob's message draft is related to a new restaurant he has heard about, and Bob would like to alert Jim to this restaurant. Through the disclosed systems and methods discussed herein, Bob can pre-classify this message prior to sending the message according to Jim's triage settings. Conventional systems only enable Bob's message to be triaged by Jim only after Jim receives the message. The disclosed systems and methods remedy such shortcomings by enabling Bob to view Jim's triage settings from the message compose screen. Bob can select the "restaurant" category resulting in such classification being applied to the message prior to the message being sent to Jim. Therefore, when the message is delivered to Jim, the message is displayed in accordance with the settings Jim as defined for "restaurant" messages. For example, if "restaurant" messages are to be flagged upon receipt, Bob's message will be automatically flagged upon receipt by Jim. In another example, if "restaurant" messages are to be filtered to a "restaurant" folder, then Bob's message will bypass Jim's main inbox and be sent directly to the "restaurant" folder. Thus, Bob's message can be classified and delivered to Jim in accordance with Jim's triage settings based solely on input from Bob (the sender) without any input required from Jim (the recipient).

The disclosed systems and methods provide additional control of delivered messages not previously present in existing message platforms, services, programs or applications. In some embodiments, such control may be based on an applied or installed protocol or application level enhancement to existing messaging systems that enables the disclosed message triaging capabilities for a sender of a message. In some embodiments, the message triaging capabilities as discussed herein may be effectuated through new or existing messaging systems being configured to enable a sender to pre-classify messages, as discussed herein.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102 and client device 101. FIG. 1 additionally includes a variety of servers, such as content server 106, application (or "App") server 108, messaging server 120 and advertising ("ad") server 130.

One embodiment of mobile devices 102-103 is described in more detail below. Generally, however, mobile devices 102 may include virtually any portable computing device capable of receiving and sending a message over a network, such as network 105, wireless network 110, or the like. Mobile devices 102 may also be described generally as client devices that are configured to be portable. Thus, mobile devices 102 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, phablets, intelligent clothing, integrated devices combining one or more of the preceding devices, and the like. As such, mobile devices 102 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 may uniquely identify themselves through any of a variety of mechanisms, including a phone number, Mobile Identification Number (MIN), an electronic serial number (ESN), or other mobile device identifier.

In some embodiments, mobile devices 102 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-102 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102 and its components with network 105. Wireless network 110 may include any of a variety of wireless sub-networks that may further overlay stand-alone ad-hoc networks, and the like, to provide an infrastructure-oriented connection for mobile devices 102. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102 and another computing device, network, and the like.

Network 105 is configured to couple content server 106, application server 108, or the like, with other computing devices, including, client device 101, and through wireless network 110 to mobile devices 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, phablets, intelligent clothing, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, photo services, web services, third-party services, audio services, video services, instant messaging (IM) services, SMS services, MMS services, FTP services, voice over IP (VOIP) services, or the like. Such services, for example the email services and email platform, can be provided via the messaging server 120. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, email servers, social networking services servers, SMS servers, IM servers, MMS servers, exchange servers, photo-sharing services servers, and travel services servers, via the network 105 using their various devices 101-102. In some embodiments, applications, such as a messaging application (e.g., Yahoo! Messenger®, Yahoo! Mail®, and the like), can be hosted by the application server 108. Thus, the application server 108 can store various types of applications and application related information including application data and user profile information. In another example, messaging server 120 can host email applications; therefore, the messaging server 120 can store various types of applications and application related information including email application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
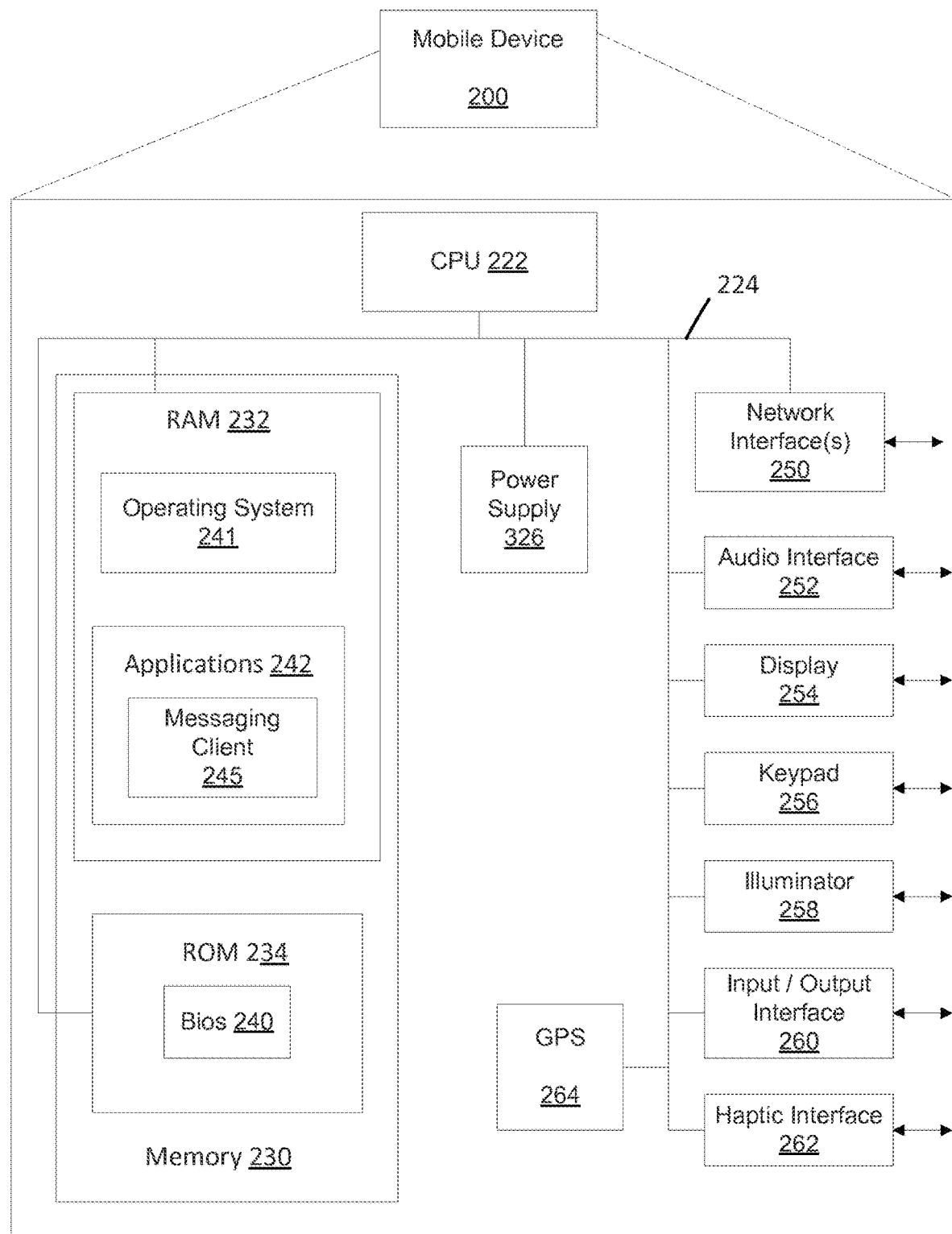
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using email, SMS, MMS, IM, VOIP, and/or any of a variety of other messaging communication protocols. Although a single messaging client 245 is illustrated it should be clear that multiple messaging clients may be employed. For example, one messaging client may be configured to manage email messages, where another messaging client manages SMS messages, and yet another messaging client is configured to manage serving advertisements, IMs, or the like.

Having described the components of the general architecture employed within the disclosed systems and methods, the components' general operation with respect to the disclosed systems and methods will now be described.

Figure 3:
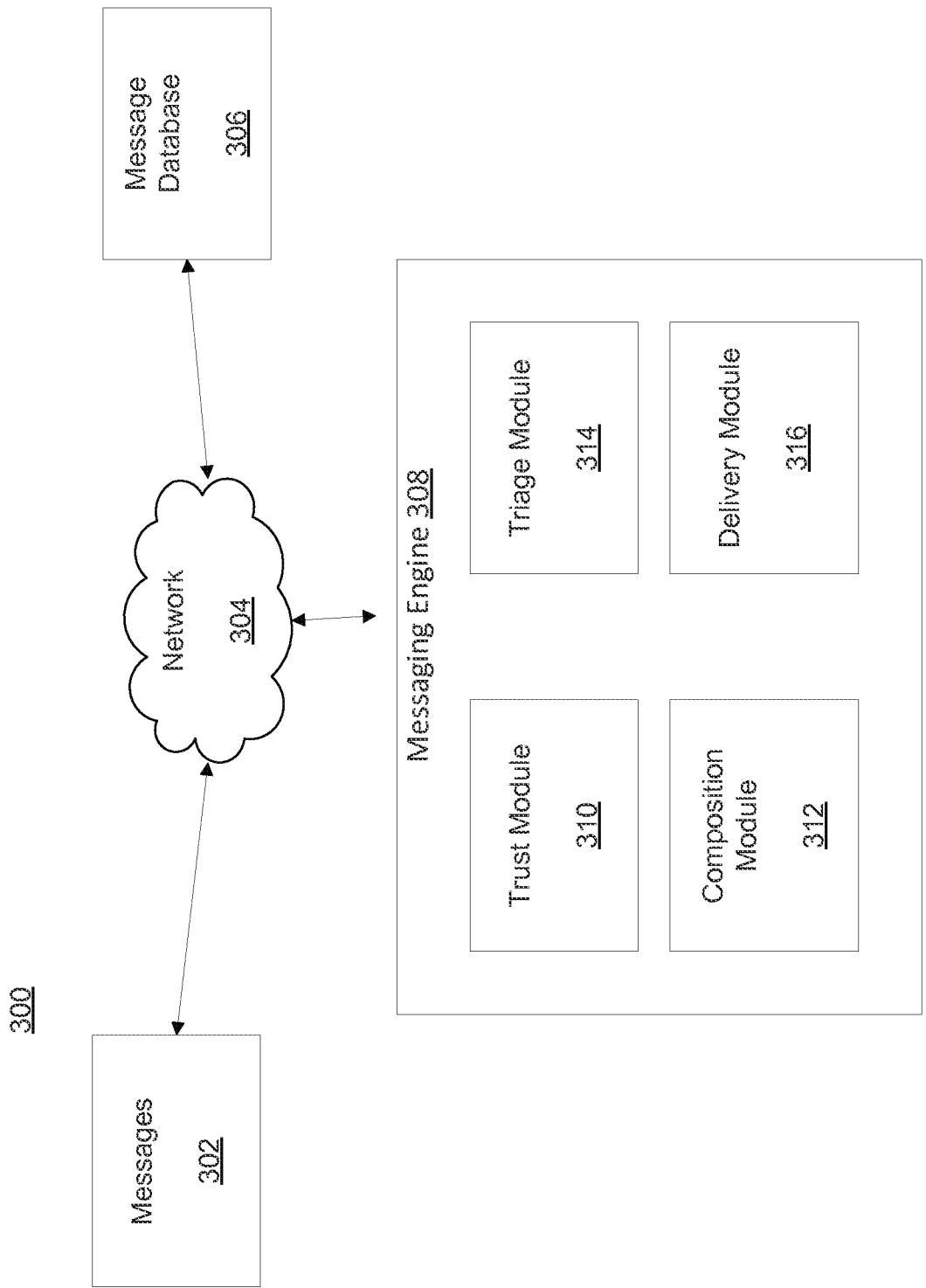
FIG. 3 is a schematic block diagram illustrating components of a system in accordance with embodiments of the present disclosure.

FIG. 3 is a block diagram illustrating the components of system 300 for performing the systems and methods discussed herein. FIG. 3 includes a plurality of messages 302, a network 304, a messaging engine 308 and a database 306 for storing messages. The message engine 308 could be hosted by a web server, content provider, email service provider, ad server, a user's computing device, or any combination thereof. The plurality of messages 302 can be any type of message. Examples of such messages 302 can include email messages, HTML forms SMS/MMS messages, Skype® messages, Twitter® messages and other social messages, comments to an article or website, online forum posts/entries, word processing documents, help desk messages, portable document format (PDF) documents and/or other types of documents. The messages 302 can be provided to the message engine 308 or accessed by a computer program or device that can access the messages. In some embodiments, the messages 302 can be stored in a database of stored messages 306, which is associated with an email provider, such as Yahoo! Mail®. The database 306 can be any type of database, file or data storage or memory that can store the messages 302 and associated message information, as discussed above.

For purposes of the present disclosure, email messages as a whole are discussed within some embodiments; however, it should not be construed to limit the applications of the systems and methods discussed herein. Indeed, while reference is made throughout the instant disclosure to email messages, other forms of electronic documents or transmissions (e.g., Short Message Service (SMS) messages, Multimedia Message Service (MMS) messages, and the like) can be communicated and/or accessed and processed by the message engine 308 according to the systems and methods discussed herein.

As discussed above, with reference to FIG. 1, the network 304 can be any type of network such as, but not limited to, a wireless network, a local area network (LAN), wide area network (WAN), the Internet, or a combination thereof. The network 304 facilitates connectivity between the messages 302, the message engine 308, and the database of stored resources 306.

The principal computing device, processor, server, or combination of devices that comprises hardware programmed in accordance with the special purpose functions herein, referred to for convenience as message engine 308, includes a trust module 310, composition module 312, triage module 314 and delivery module 316. It should be understood that the engine(s) and modules discussed herein are non-exhaustive, as additional or fewer engines and/or modules may be applicable to the embodiments of the systems and methods discussed. The operations, configurations and functionalities of each module, and their role within embodiments of the present disclosure will be discussed with reference to FIG. 4.

Figure 4:
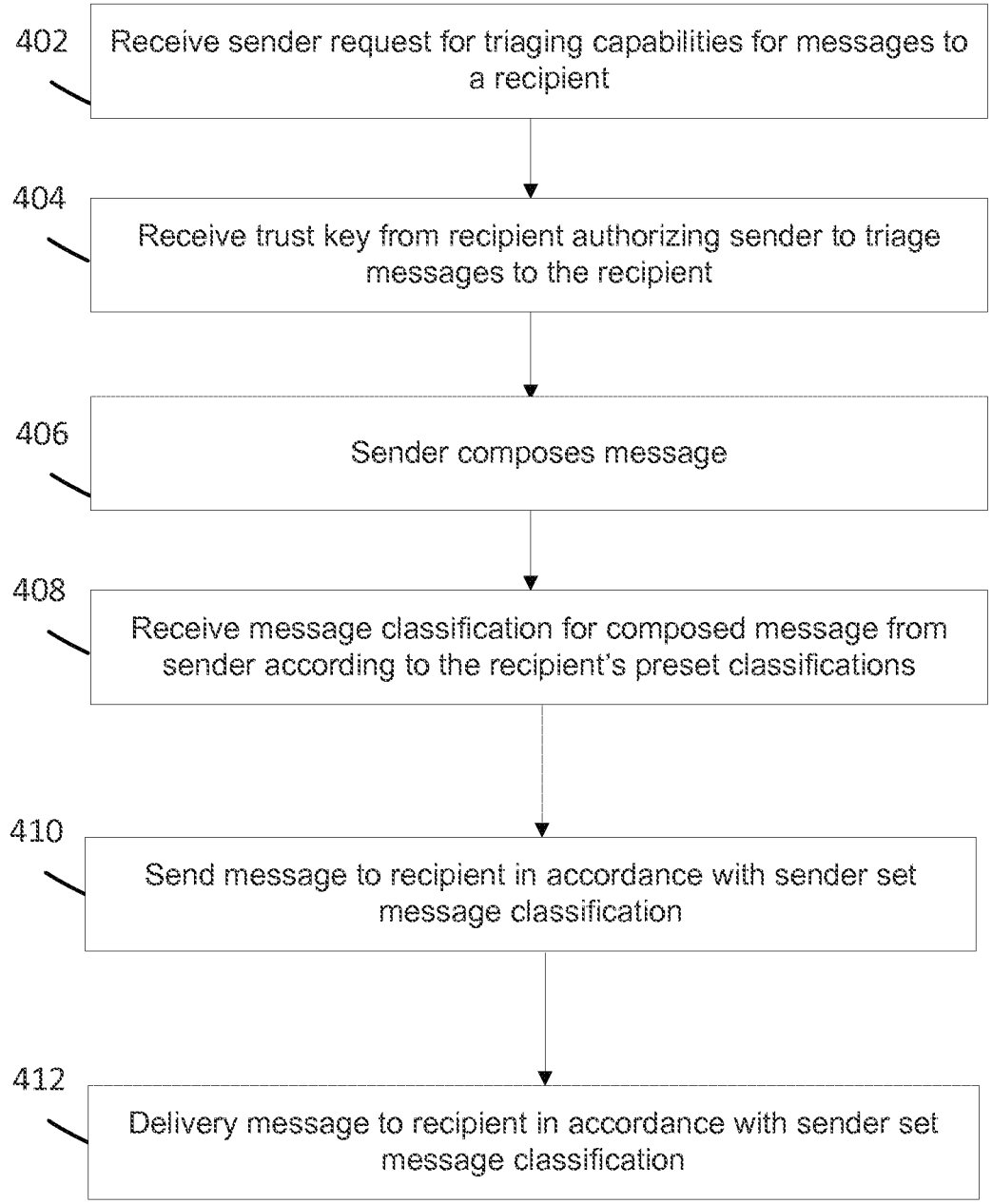
FIG. 4 is a flowchart illustrating steps performed in accordance with some embodiments of the present disclosure.

FIG. 4 is a process 400 diagram illustrating steps performed in accordance with embodiments of the present disclosure that enable a sender of a message to classify, categorize or otherwise triage a message according to a recipient's triaging settings before actually sending the message. As discussed in more detail herein, after a sender is authenticated by a recipient, the sender is authorized to pre-classify an intended message for the recipient in accordance with the recipient's defined classifications.

Recipient defined classifications can include, but are not limited to, labeling (or flagging or tagging) messages, categorizing messages and/or filtering messages based on the sender's identity, subject of the message, content of the message, date of the message, or any other type of message content or metadata associated with a message. As discussed in more detail below, when the sender is drafting a message or upon completion of drafting the message but prior to sending the message, the sender can access, view and select a recipient-specific defined classification, and apply the selected classification to the message draft. Therefore, when the message is sent to the recipient, the message will be automatically triaged in accordance with the delivery and display instructions/definitions associated with the selected classification as defined by the recipient, yet selected and applied by the sender.

As discussed in more detail below, in relation to FIGS. 7-8, the disclosed sender enabled triaging can effectuate increased user engagement in received messages which can lead to increased monetization opportunities through higher click-through-rates (CTRs) and increased return-on-investment (ROI), revenues, salience and relevance of served advertisements.

Process 400 begins with Step 402 where a sender desires to send a pre-classified message to a recipient. In order for the sender to have the ability to view and select a recipient's personal triage settings, and thereby pre-classify a message according to the recipient's settings, the sender must be authenticated (or authorized) by the recipient. Such authentication enables the sender to view the recipient's triage settings set by the recipient when the sender is composing a message, as discussed in more detail below. Therefore, Step 402 involves receiving a request from a sender of a message requesting access to the personal triaging capabilities for the recipient's messaging account (or inbox). That is, sender sends a request directed to the recipient that requests access to the recipient's triaging settings or designations. The request includes an identifier of the recipient (e.g., the recipient's email address), the sender's identifier and information indicating the sender is requesting access to the recipient's personal triage settings.

In response to such request, the recipient can authorize the sender thereby giving the sender access to the recipient's designated triage settings. Step 404. The authorization is given by a trust key (or certificate) being sent to the sender. Steps 402 and 404 are performed by the trust module 310. In some embodiments, the authorization occurring in Step 404 involves the recipient identified in the sender's request (from Step 402) communicating a response that includes the trust key. The trust key of the recipient enables the sender access to the triage settings/designations of the recipient. In other embodiments the authorization may be automatically set by the messaging system based upon hierarchical or predetermined arrangements, such as, by way of non-limiting example, where employees in the same department are automatically authorized among members of the department, or a supervisor may be automatically authorized among subordinates, or family members may be authorized in a social network.

For example, the trust key can be associated with triage settings specific to a number of shared folders that the recipient has designated as being accessible by other users that have been provided the trust key. Therefore, for example, the trust key enables the sender access to the recipient's shared folders. In some embodiments, the trust key can be a global trust key for the recipient's account, which is provided to any authenticated user. In some embodiments, sender specific trust keys can be provided to specific senders, thereby enabling each requesting sender access to a specific set of classifications (or triage settings, for example, folders) in the recipient's messaging account. That is, the recipient can control which triage settings are associated with the trust key permissions given to the sender. For example, a recipient can allow a sender to access the recipient's folder designations for personal and recreational filters, but not for work related message filters. Thus, the recipient controls the permissions given to the sender, and such permissions can be revoked by the recipient at any time by contacting the sender and/or messaging server and providing information indicating that the trust key has expired or is to be deleted.

According to some embodiments, the recipient's trust key received by the sender is saved in accordance with the sender's messaging account. For example, the trust key can be saved in a database associated with the sender, whereby a trusted relationship is denoted identifying the recipient. For example, the trust key can be stored in association with the recipient's contact information in the sender's contact list. In some embodiments, Step 404 involves the recipient enabling access or giving permissions to the sender, whereby only an acknowledgement is sent to the sender. Here, the trust key allocation could be saved in accordance with the recipient's message account which identifies the sender as a trusted sender.

By way of a non-limiting example, illustrating Steps 402-404 for the authorization of a sender by a recipient, user Bob is requesting permissions from user Jim. A request is sent on behalf of Bob requesting access to Jim's personal triage settings. As discussed above, such settings can include, but are not limited to, Jim's settings for labelling, categorizing, filtering, or otherwise classifying incoming messages to Jim's inbox. For example, Jim has set triage settings to include: filter messages denoted as "work" to a "Work" folder, and label "personal" messages with a label comprising the text "personal." Upon receiving the request, Jim can either approve or deny Bob's request for permissions. In instances where Jim denies the request, Bob can be sent a message indicating Jim's denial. If Jim approves the request, Jim can approve the request as a whole, or modify the request by only providing Bob access to particular classification capabilities. For example, Jim has the ability to only provide Bob with access to his "personal" classification settings, which will enable Bob the ability to only pre-classify messages as "personal."

As discussed above, Jim's approval of Bob's request, whether modified or not, can include a trust key being sent to Bob (or it can be automatically generated based on predetermined parameters or detected relationship patterns). The trust key enables Bob access to Jim's personally set triage settings thereby enabling Bob to pre-classify a message prior to it being sent to Jim. As discussed above, the trust key can be saved in accordance with the Bob's messaging account. For example, the Jim's trust key can be saved in a database associated with Bob's mail account, whereby a trusted relationship between Bob and Jim is denoted. In some embodiments, the trust key can be stored in association with the Jim's contact information within Bob's mail account—in Bob's contact list. Therefore, whenever Bob types Jim's name in the To:, CC:, or Bcc portion of the message, Bob is capable of accessing Jim's personal classification settings. In some embodiments, Jim's authorization of Bob can also or alternatively involve Jim indicating to Bob that he has been given access or permission to his triage settings through an acknowledgement message that is sent to Bob. Here, the trust key allocation could be saved in accordance with Jim's account which identifies Bob as a trusted sender.

According to some embodiments, the authorization occurring in Steps 402-404 can be based upon an AJAX (asynchronous JavaScript® and XML) request communicated by the sender and processed by the recipient. The AJAX and related discussion herein can also be performed by the trust module 310. As understood by those of skill in the art, through an AJAX request initiated by the sender, the sender's mail application can send data to and retrieve related data from a server associated with the recipient asynchronously (in the background) without interfering with the behavior of the sender and/or recipient's messaging accounts (e.g., inbox). In accordance with this embodiment, data associated with the sender's request and the trust (or token) key authorization sent by the recipient can be retrieved and processed using an XMLHttpRequest object. In some embodiments, the processing of such data may not be asynchronous, as it can be structured as a JSON (JavaScript® Object Notation) within an AJAJ (AJAX and JSON) environment.

Thus, through implementation of the sender's AJAX request, the recipient can be presented with a document object model (DOM) that is dynamically displayed to allow the recipient to interact with and give the requested permissions. The AJAX embodiment discussed herein enables the sender (i.e., the sender's mail application or server) and receiver (i.e., receiver mail application or server) to exchange data (e.g., the request and response) asynchronously.

According to some embodiments, while the discussion above involves an AJAX request, the present disclosure is not so limited. That is, embodiments exist where any known or to be known Web application communication environment can be implemented, where such communication and authorization can occur between the web application's server and client(s) in the background without interfering with the current state of each user's message account. For example, any known or to be known AJAX framework, Reverse AJAX, WebSocket, ActionScript or other known or to be known Rich Internet Application can be utilized without diverging from the scope of the instant disclosure, while maintaining the processing occurring in Steps 402-404.

Therefore, based on the above discussion, as a result of Step 404, the sender is given permissions to triage or classify messages for the recipient in accordance with the recipient's personally defined classifications (referred to as triage settings, as discussed above). As discussed above, the recipient defined classifications can include, but are not limited to, labeling (or flagging or tagging) messages, categorizing messages and/or filtering messages based on the sender's identity, subject of the message, content of the message, date of the message, or any other type of message content or metadata associated with a message.

Figure 5:
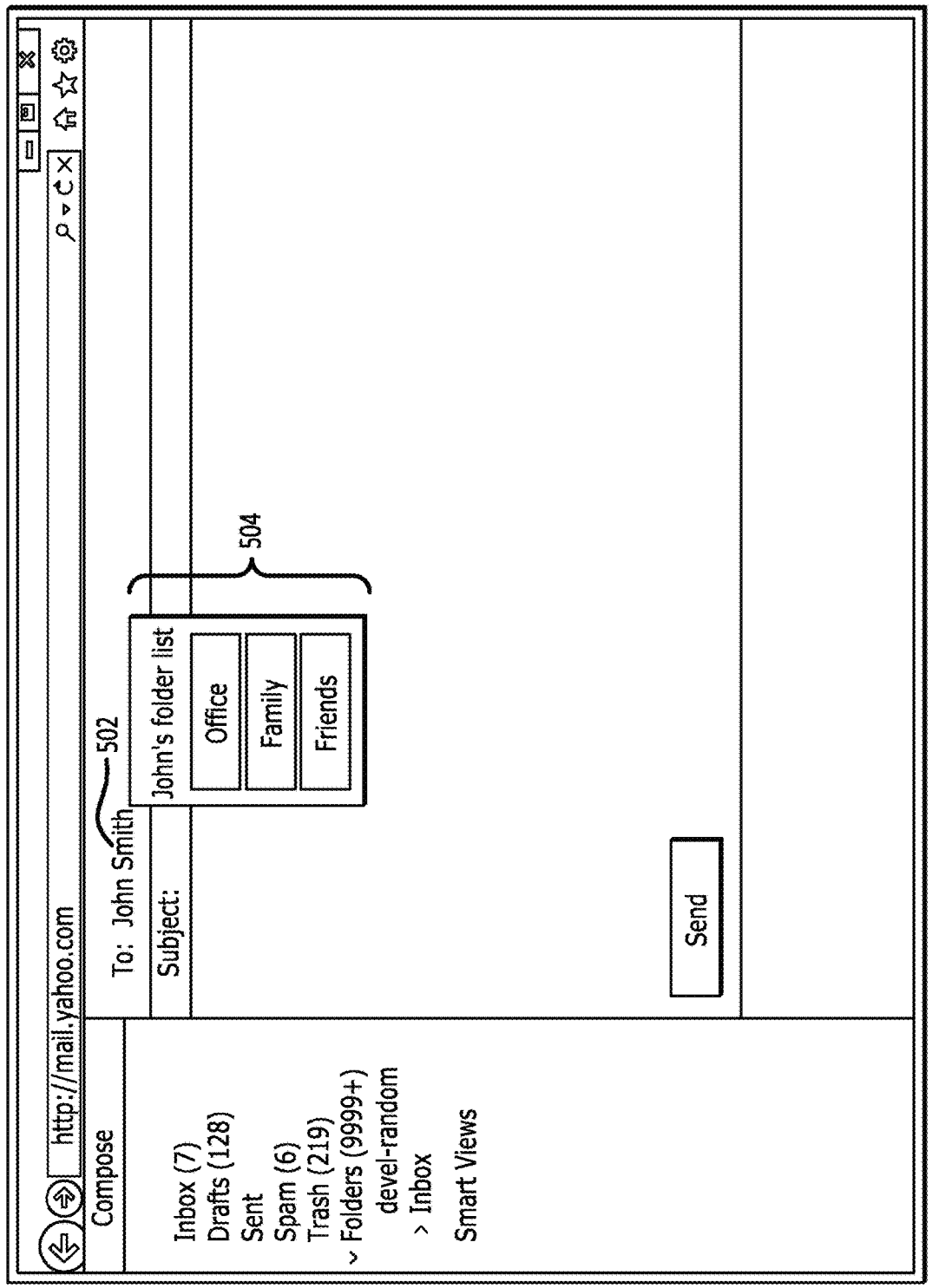
FIG. 5 illustrates an example embodiment in accordance with some embodiments of the present disclosure.

Process 400 continues in Step 406 where the sender begins composing a message to the recipient for which he/she is an authorized sender. Step 406 is performed by the composition module 312. As discussed above, composition of the message includes any message, whether a new message, reply message or forwarded message that is being drafted or already has been completed, but has yet to be sent. For example, as illustrated in FIG. 5, a message compose screen 500 is displayed where the sender is drafting a message to recipient 502.

In Step 408, the sender sets the triage settings for the message. Step 408 is performed by the triage module 314. For example, as illustrated in FIG. 5, the sender composes a message 500 to be sent to a recipient 502. In FIG. 5, the sending user can toggle the triage settings 504 associated with the sender by clicking on (or hover his/her mouse, or other input mechanism) the recipient identifier (ID) 502 in the message compose screen 500. In some embodiments, the triage settings 504 can be presented to the user as a drop down menu originating from the recipient's ID 502, as depicted in FIG. 5.

In some embodiments, the sender can be presented with a dialog box or pop-up prompt enabling the sender to view the recipient's triage settings 504. It should be understood that the display of the recipient's triage settings 504 are not limited to a drop down or prompt window, as any known or to be known mechanism can be utilized, such as, automatically displaying the triage settings upon entry of a trusted recipient, displaying icons next to or in association with the recipient's ID 502, displaying the drop down, prompt or icon(s), or an interface object in the message body, in the toolbar of the browser or toolbar of the content user interface, via a separate button displayed in the user interface associated with the message compose screen 500, and the like.

According to embodiments of the present disclosure, the toggling of the recipient's triage settings 504 involves a search within the sender's account for the trust key associated with the recipient 502. As discussed above, the trust key can be saved in connection with the sender's message account and in association with the recipient's information (e.g., the recipient information stored in the sender's contact list). Therefore, upon input of the ID of the recipient 502, or toggling the recipient's ID 502, as discussed above, a search of the sender's account information is performed to determine if a trust key exists for the recipient. Upon identification of the trust key, the associated classifications denoted by the trust key specific to the recipient are then displayed in association with the message compose screen 500, as discussed above and illustrated as an example in FIG. 5. In some embodiments, the stored trust key in the sender's account (or profile) associated with the recipient can include the recipient's triage settings 504. In some embodiments, identification of the trust key can further involve pinging the messaging server associated with the recipient's account to retrieve the triage settings (or updated settings) designated by the recipient. Therefore, Step 408 involves a "trust" handshake occurring between the sender and server of the recipient (and/or recipient), as discussed above.

For example, as illustrated in FIG. 5, a sender is drafting a message 500 to recipient 502. The user can interact with the recipient's ID 502 denoted in the "To:" line of the message 500 thereby toggling the recipient's personal triage settings 504 (which were provided to the sender in accordance with the above discussion related to Steps 402-404). Recipient 502 has enabled the sender access to the settings 504 for classifying messages related to the topics: "Office," "Family" and Friends." As discussed above, such classifications can involve labeling (or flagging or tagging), categorizing and/or filtering messages associated with each classification.

As above, each classification is personally set by the recipient 502. For example, messages classified as "Office" can be set by the recipient to be filtered to a specific "Office" folder which can be a sub-folder in the recipient's inbox; messages classified as "Family" can be categorized in the recipient's inbox by applying a specific color code to the message, which can be displayed in accordance with the messages' displayed header information (e.g., "From:"); and messages classified as "Friends" can be labeled with the character string "Family." The delivery and result of the pre-classification of a message by a sender in recipient 502's inbox will be discussed in more detail below in connection with Steps 410-412 and FIG. 6.

According to some embodiments, the application of a message classification by the sender involves modifying the metadata of the message. Such modification can involve either inputting message classification information in the metadata or header portion of the message, or modifying existing metadata or header data with the message classification information. The classification information denotes that the message is to be delivered and displayed in the recipient's inbox, and processed by the recipient's message account server in accordance with the triage settings set by the recipient and applied by the sender.

Figure 6:
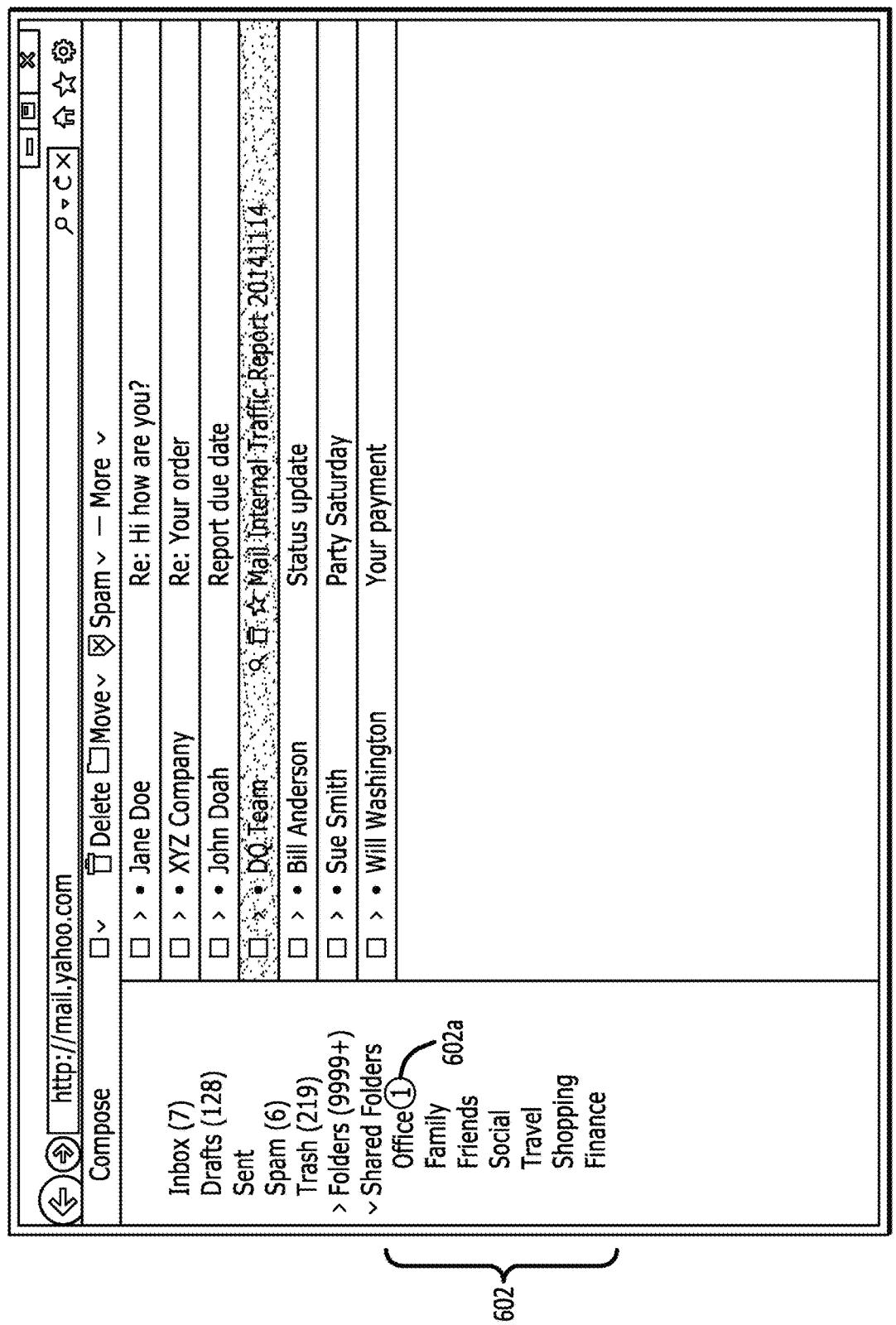
FIG. 6 illustrates an example embodiment in accordance with some embodiments of the present disclosure.

For example, a sender classified a message to a recipient as "Office." As such, based on the above example, when the message is delivered to the recipient 502 inbox, the message will be filtered to the "Office" subfolder of the recipient's inbox (as illustrated in FIG. 6 as discussed below). This handling can be performed by the recipient's messaging account server upon receiving the message, or by the recipient's mail program or application; however, such processing occurs prior to the display of the message so as to effectuate a classification of the message as if the recipient has set the classification, even though the sender has performed such classification, as discussed in more detail below.

Process 400 then proceeds to Step 410 where the pre-classified message is sent to the recipient. That is, the message drafted by the sender, which was classified by the sender according to the recipient's personal triage settings, is delivered to the recipient. Step 410 is performed by the delivery module 316. Step 410 involves the messaging server receiving the message from the recipient and parsing the message to identify not only the typical information such as sender ID and recipient ID (e.g., email address, IP address), and the like, but also applied classification information. As discussed above, the classification information set by the sender is input into the message metadata or header. Therefore, Step 410 involves the server parsing the message metadata/header to identify the classification information (or data). In some embodiments, the parsing occurring in Step 410 can occur on the recipient's device instead of on the messaging server. However, whether the parsing occurs on the server, on the recipient's device, or some combination thereof, the identification of the classification information occurs prior to the display of the message in the recipient's inbox. This ensures that the message is being displayed in accordance with the pre-defined settings the recipient has designated for message of a particular type.

Therefore, after identifying the classification information which governs how the message is to be displayed in the recipient's inbox, the message is then displayed in the recipient's inbox in accordance with such classification information. Step 412. Step 412 is performed by the delivery module 316. As discussed above and depicted in FIG. 6, in accordance with the above example discussed in relation to FIG. 5, recipient inbox 600 can include a folder section within the inbox folders related to "shared folders" 602. As discussed above, the shared folders 602 can be the folders that the recipient has denoted as accessible to those other users (senders) that have been provided a trust key.

Therefore, from the above example discussed in relation to FIG. 5, the sender classified the message 500 as "Office," which carried the designation set by the recipient 502 to filter such messages to an "Office" subfolder. As such, and continuing the example as illustrated in FIG. 6, the "Office" folder 602a is displayed within the shared folders 602 in the recipient inbox 600, and as indicated in FIG. 6, the recipient is notified of the newly received and classified/triaged message by the notification accompanying the "Office" folder 602a. It should be understood that any known or to be known mechanism for notifying a recipient of a newly received message is applicable to the discussion herein. Indeed, the type of notification received by the recipient may be classification based, in that the type of classification may be directly associated with the type of classification applied to the received message. Also, the folder arrangement can also be flexibly applied and need not be shared folders, as this is just presented for illustration.

According to some embodiments, upon the sender sending the message to the recipient (as in Step 410), the sent message is directed to the sender's sent folder. In some embodiments, the sender's sent folder may be categorized according to trusted recipients, whereby pre-classified messages in the sender's sent folder will also be denoted with the classification setting set by the recipient. For example, if the sent classified message is to be labeled upon delivery to the recipient, then the sent message will also have the label in the sender's sent folder.

In another example, if the sent classified message is to be filtered to a sub-folder of the recipient's inbox, for example an "Office" sub-folder, then the sender's sent folder may also be organized in a similar manner. For example, if user Bob sent user Jim a message classified as "Office" as discussed above, then Bob's sent folder may include the directory "inbox/sent_mail/Jim/Office." This example of a directory string of the sender's mailbox illustrates that sent messages can be categorized in the sender's sent folder not only according to the classifications set by the sender, but also in accordance with the identity of the recipient. In some embodiments, for the sub-directory for a specific recipient to appear in the sender's sent folder, the sender must have sent the recipient a number of messages satisfying a predetermined threshold (set by the sender, recipient, message server, or some combination thereof). In some embodiments, the sub-folder specific to the recipient can be created in the sender's sent folder upon receipt (and based on) the reception of the trust key (or creation of the trusted relationship). As such, all messages communicated between the sender and recipient (e.g., all messages in a message chain) will maintain the classification preset by the sender. However, embodiments exist where the sender and/or recipient may remove the classification at any time after delivery of the first sender classified message.

According to some embodiments, the disclosed systems and methods discussed herein can be per user or an aggregate of users. For purposes of this disclosure, the focus will be on delivering messages to a single user; however, it should not be construed as limiting, as the systems and methods discussed herein are applicable to a plurality of users, as Process 400 is applicable to not only a plurality of users analyzed individually, but also to a plurality of users analyzed as an aggregate. Indeed, in accordance with the above discussion, if a sender is sending messages to a group of users (for example two recipients), then the sender may classify the message according to each recipient's triage settings. Therefore, when the message is delivered to the first recipient, the message will be handled according to the first recipient's triage settings as set by the sender; and when the message is delivered to the second recipient, the message will be handled according to the second recipient's triage settings as set by the sender.

For example, user Bob is sending a message to Jim and Jane. Bob is authenticated to pre-classify messages for Jim and Jane. During composition of the message, Bob can select a triage setting specifically related to Jim, and another triage setting specifically related to Jane. Therefore, the message has associated triage settings for both recipients. As discussed below, these settings are embedded in the metadata of the message; therefore, when the message is delivered to each recipient, only the triage setting applicable to the recipient user can be read. Thus, each recipient receives the message from Bob, and the message is delivered and displayed in each recipient's inbox according to each user's personal triage settings.

In some embodiments, the disclosed systems and methods can be performed from (or within) a single message platform, e.g., Yahoo! Mail®; and in some embodiments, the across multiple platforms, such as Yahoo! Mail®, Google Mail®, Hotmail®, and other personal and business email platforms, such as Microsoft Outlook®, and the like. In some embodiments, at least some steps performed in Process 400 of FIG. 4 can be performed offline and/or online.

Figure 7:
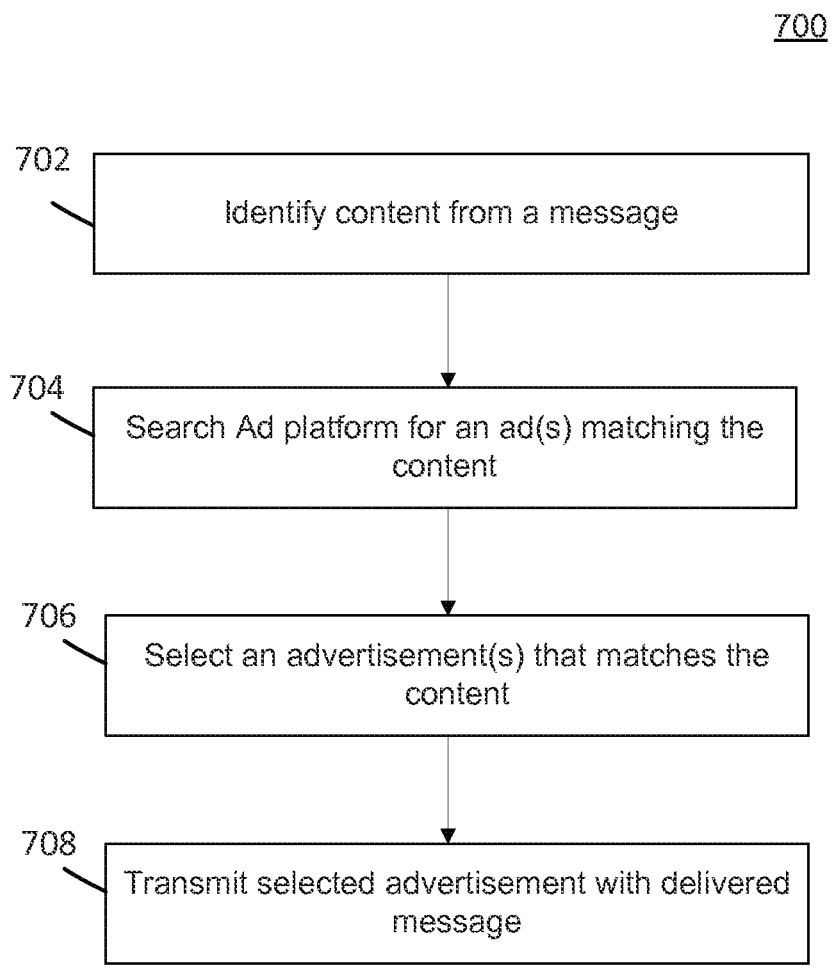
FIG. 7 is a flowchart illustrating steps performed in accordance with some embodiments of the present disclosure

FIG. 7 is a work flow 700 of serving relevant advertisements based on the content of delivered messages. Specifically, FIG. 7 illustrates how advertisements are served to a recipients of messages based on the specific content from the messages directed to a recipient. It should be understood that such content is not limited to the content of the email's body—such content can include, but is not limited to, the subject of the message, the sender's identity, the recipient's identity, the type of classification, and the like.

In Step 702, content from a communicated message, as discussed above, is identified (or extracted). That is, content in a message, or a type of content associated with a message that is sent from a sender for receipt by a recipient forms a basis for a context for serving advertisements having a similar context. In some embodiments, the identification of the context from Step 702 may occur during drafting the message, prior to delivery of the message, upon delivery of the message, and/or after delivery of the message, or some combination thereof. In Step 704, the content (or content data) is communicated (or shared) from the email platform to an advertisement platform comprising an advertisement server 130 and ad database. Upon receipt of the content data, the advertisement server 130 performs a search for a relevant advertisement within the associated ad database. The search for an advertisement is based at least on the identified content.

In Step 704, the advertisement server 130 searches the ad database for advertisements that match the identified (and extracted) content. In Step 706, an advertisement is selected (or retrieved) based on the results of Step 704. In some embodiments, the advertisement can be selected based upon the result of Step 704, and modified to conform to attributes of the page or inbox upon which the advertisement will be displayed, and/or to the device for which it will be displayed. In some embodiments, as in Step 708, the selected advertisement is shared or communicated via the email platform. In some alternative embodiments, the selected advertisement is sent directly to each user's computing device (e.g., the sender and/or recipient's inbox).

Figure 8:
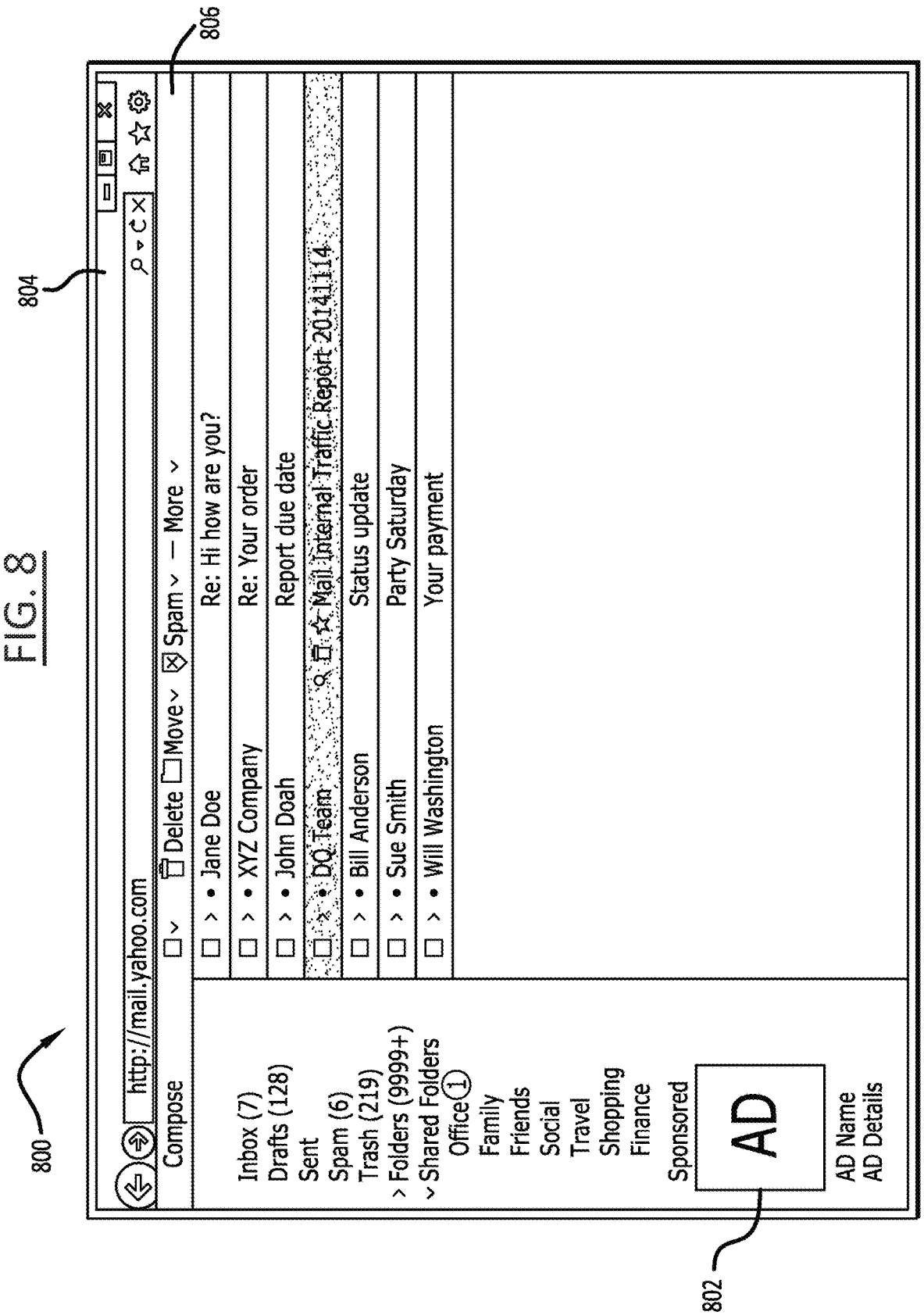
FIG. 8 illustrates an example embodiment in accordance with some embodiments of the present disclosure.

According to some embodiments, in accordance with the above discussion in relation to FIGS. 4-7, and as illustrated in FIG. 8, the communicated advertisement, from Step 708, can be displayed in many different ways. As in FIG. 8, the advertisement can be displayed in conjunction with the message appearing in the recipient's inbox 800. That is, according to some embodiments in connection with the above discussion, the selected advertisement can be shared/communicated upon the message being visibly displayed in the recipient's inbox 800. For example, the ad can be displayed within a side pane or panel 802 of the inbox 800, as illustrated in FIG. 8. In some embodiments, an advertisement can be displayed in a toolbar 804 associated with a browser displaying web content (e.g., as a toolbar 804 or interface object displayed on, in or in association with the browser user interface) and/or in a content toolbar 806 displayed on the web page displaying the inbox 800 (e.g., on a toolbar 806 displayed on the content user interface), as depicted in FIG. 8. In some embodiments, the advertisement can be served to the user on a landing page associated with a service provider's home page (e.g., Yahoo!® Home page) or other pages as the user browses the Internet, or as other types of messages such as SMS, MMS or according to any other known or to be known messaging applications, and the like, as understood by those of skill in the art.

As shown in FIG. 9, internal architecture 900 includes one or more processing units, processors, or processing cores, (also referred to herein as CPUs) 912, which interface with at least one computer bus 902. Also interfacing with computer bus 902 are computer-readable medium, or media, 906, network interface 914, memory 904, e.g., random access memory (RAM), run-time transient memory, read only memory (ROM), media disk drive interface 920 as an interface for a drive that can read and/or write to media including removable media such as floppy, CD-ROM, DVD, media, display interface 910 as interface for a monitor or other display device, keyboard interface 916 as interface for a keyboard, pointing device interface 918 as an interface for a mouse or other pointing device, and miscellaneous other interfaces not shown individually, such as parallel and serial port interfaces and a universal serial bus (USB) interface.

Memory 904 interfaces with computer bus 902 so as to provide information stored in memory 904 to CPU 912 during execution of software programs such as an operating system, application programs, device drivers, and software modules that comprise program code, and/or computer executable process steps, incorporating functionality described herein, e.g., one or more of process flows described herein. CPU 912 first loads computer executable process steps from storage, e.g., memory 904, computer readable storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage, e.g., medium/media 906, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 928 typically provides information communication using transmission media through one or more networks to other devices that use or process the information. For example, network link 928 may provide a connection through local network 924 to a host computer 926 or to equipment operated by a Network or Internet Service Provider (ISP) 930. ISP equipment in turn provides data communication services through the public, worldwide packet-switching communication network of networks now commonly referred to as the Internet 932.

A computer called a server host 934 connected to the Internet 932 hosts a process that provides a service in response to information received over the Internet 932. For example, server host 934 hosts a process that provides information representing video data for presentation at display 910. It is contemplated that the components of system 900 can be deployed in various configurations within other computer systems, e.g., host and server. Network link 929 may provide a connection for system 900 directly to the internet 932.

At least some embodiments of the present disclosure are related to the use of computer system 900 for implementing some or all of the techniques described herein. According to one embodiment, those techniques are performed by computer system 900 in response to processing unit 912 executing one or more sequences of one or more processor instructions contained in memory 904. Such instructions, also called computer instructions, software and program code, may be read into memory 904 from another computer-readable medium 906 such as storage device or network link. Execution of the sequences of instructions contained in memory 904 causes processing unit 912 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 900. Computer system 900 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 602 as it is received, or may be stored in memory 604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed:

1. A method comprising:
   receiving, at a server over a network from a first user, a message addressed to an inbox associated with a second user, said message comprising classification information applied by the first user prior to sending the message, said classification information comprising instructions designated by the first user for triaging the message in the user inbox of the second user;
   parsing, via the server, said message upon said reception, and based on said parsing, identifying said classification information;
   modifying, via the server, upon receiving the message from the first user and prior to sending the message to said second user, the message based on said identified classification information by modifying existing metadata of the message based on the identified classification information such that when the message is delivered to said second user inbox, the message causes a receiving inbox to automatically triage the message according to said instructions; and
   communicating, via the server over the network, said modified message to said second user inbox, said communication causing, based on the modified metadata of the message, the modified message to be automatically triaged in the second user inbox by the server in accordance with the classification information applied by the first user and inserted into the message during said modification.

2. The method of claim 1, further comprising:
   receiving, at the server over the network from the first user, a request for said first user to be granted permission to pre-classify messages for the second user according to said classification information; and in response to said request, transmitting, over the network, a trust key from said second user to said first user, said trust key enabling said classification information of the first user to be associated with said second user inbox.

3. The method of claim 2, further comprising:
storing said trust key in a database associated with a message account of said first user.

4. The method of claim 2, further comprising:
storing said trust key in a database associated with a message account of said second user.

5. The method of claim 1, wherein a classification request is received from the first user prior to the first user sending the message.

6. The method of claim 1, wherein said classification information is embedded in metadata of said message, wherein said parsing comprises parsing the metadata of said message to identify said classification information.

7. The method of claim 1, wherein said classification information comprises instructions set by the first user for categorizing messages sent by the first user within said second user inbox.

8. The method of claim 1, wherein said classification information comprises instructions set by the first user for filtering messages sent by the first user to a folder within said second user inbox.

9. The method of claim 1, wherein said classification information comprises instructions set by the first user for applying a label to messages sent by the first user upon display within said second user inbox.

10. A non-transitory computer-readable storage medium tangibly encoded with computer-executable instructions, such that when a server executes the instructions, a method is performed comprising:
receiving, at the server over a network from a first user, a message addressed to an inbox associated with a second user, said message comprising classification information applied by the first user prior to sending the message, said classification information comprising instructions designated by the first user for triaging the message in the second user inbox;
parsing, via the server, said message upon said reception, and based on said parsing, identifying said classification information;
modifying, via the server, upon receiving the message and prior to sending the message to said second user, the message based on said identified classification information by modifying existing metadata of the message based on the identified classification information such that when the message is delivered to said second user inbox, the message causes a receiving inbox to automatically triage the message according to said instructions; and
communicating, via the server over the network, said modified message to said second user inbox, said communication causing, based on the modified metadata of the message, the modified message to be automatically triaged in the second user inbox by the server in accordance with the classification information applied by the first user and inserted into the message during said modification.

11. The non-transitory computer-readable storage medium of claim 10, further comprising:
receiving, at the server over the network from the first user, a request for said first user to be granted permission to pre-classify messages for the second user according to said classification information; and in response to said request, transmitting, over the network, a trust key from said second user to said first user, said trust key enabling said classification information of the first user to be associated with said second user inbox.

12. The non-transitory computer-readable storage medium of claim 11, further comprising:
storing said trust key in a database associated with a message account of said first user.

13. The non-transitory computer-readable storage medium of claim 11, further comprising:
storing said trust key in a database associated with a message account of said second user.

14. The non-transitory computer-readable storage medium of claim 10, wherein a classification request is received from the first user prior to the first user sending the message.

15. The non-transitory computer-readable storage medium of claim 10, wherein said classification information is embedded in metadata of said message, wherein said parsing comprises parsing the metadata of said message to identify said classification information.

16. The non-transitory computer-readable storage medium of claim 10, wherein said classification information comprises instructions set by the first user for categorizing messages sent by the first user within said second user inbox.

17. The non-transitory computer-readable storage medium of claim 10, wherein said classification information comprises instructions set by the first user for filtering messages sent by the first user to a folder within said second user inbox.

18. The non-transitory computer-readable storage medium of claim 10, wherein said classification information comprises instructions set by the first user for applying a label to messages sent by the first user upon display within said second user inbox.

19. A server comprising:
a processor; and
a non-transitory computer-readable storage medium for tangibly storing thereon program logic for execution by the processor, the program logic comprising:
logic executed by the processor for receiving, over a network from a first user, a message addressed to an inbox associated with a second user, said message comprising classification information applied by the first user prior to sending the message, said classification information comprising instructions designated by the first user for triaging the message in the second user inbox;
logic executed by the processor for parsing said message upon said reception, and based on said parsing, identifying said classification information;
logic executed by the processor for modifying upon receiving the message and prior to sending the message to said second user, the message based on said identified classification information by modifying existing metadata of the message based on the identified classification information such that when the message is delivered to said second user inbox, the message causes a receiving inbox to automatically triage the message according to said instructions; and
logic executed by the processor for communicating, over the network, said modified message to said second user inbox, said communication causing, based on the modified metadata of the message, the modified message to be automatically triaged in the second user inbox by the server in accordance with the classification information applied by the first user and inserted into the message during said modification.

20. The server of claim 19, further comprising:

logic executed by the processor for receiving, over the network from the first user, a request for said first user to be granted permission to pre-classify messages for the second user according to said classification information; and logic executed by the processor for transmitting, over the network, a trust key from said second user to said first user, said trust key enabling said classification information of the first user to be associated with said second user inbox.

\* \* \* \* \*